UNITED STATES PATENT OFFICE.

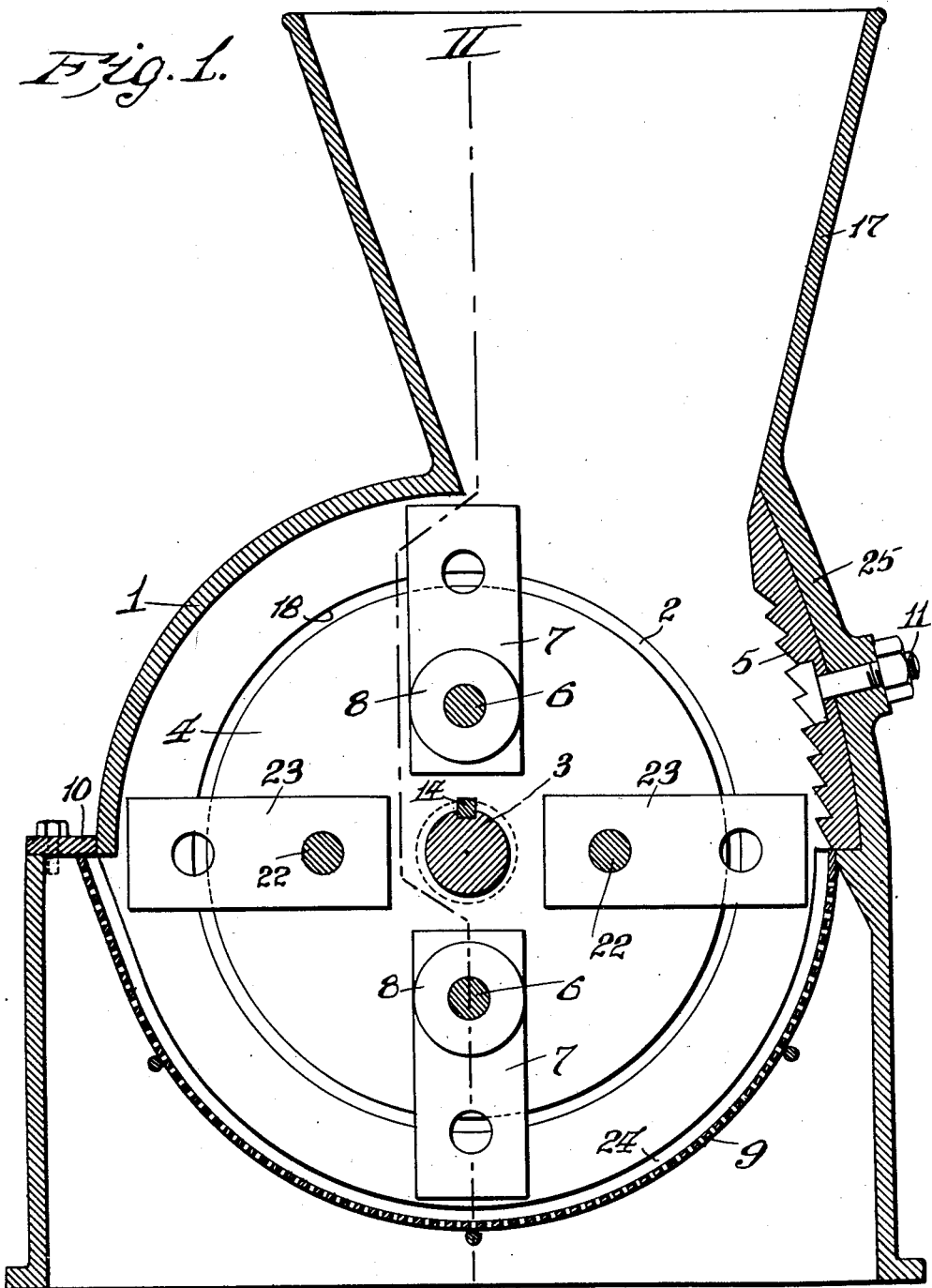

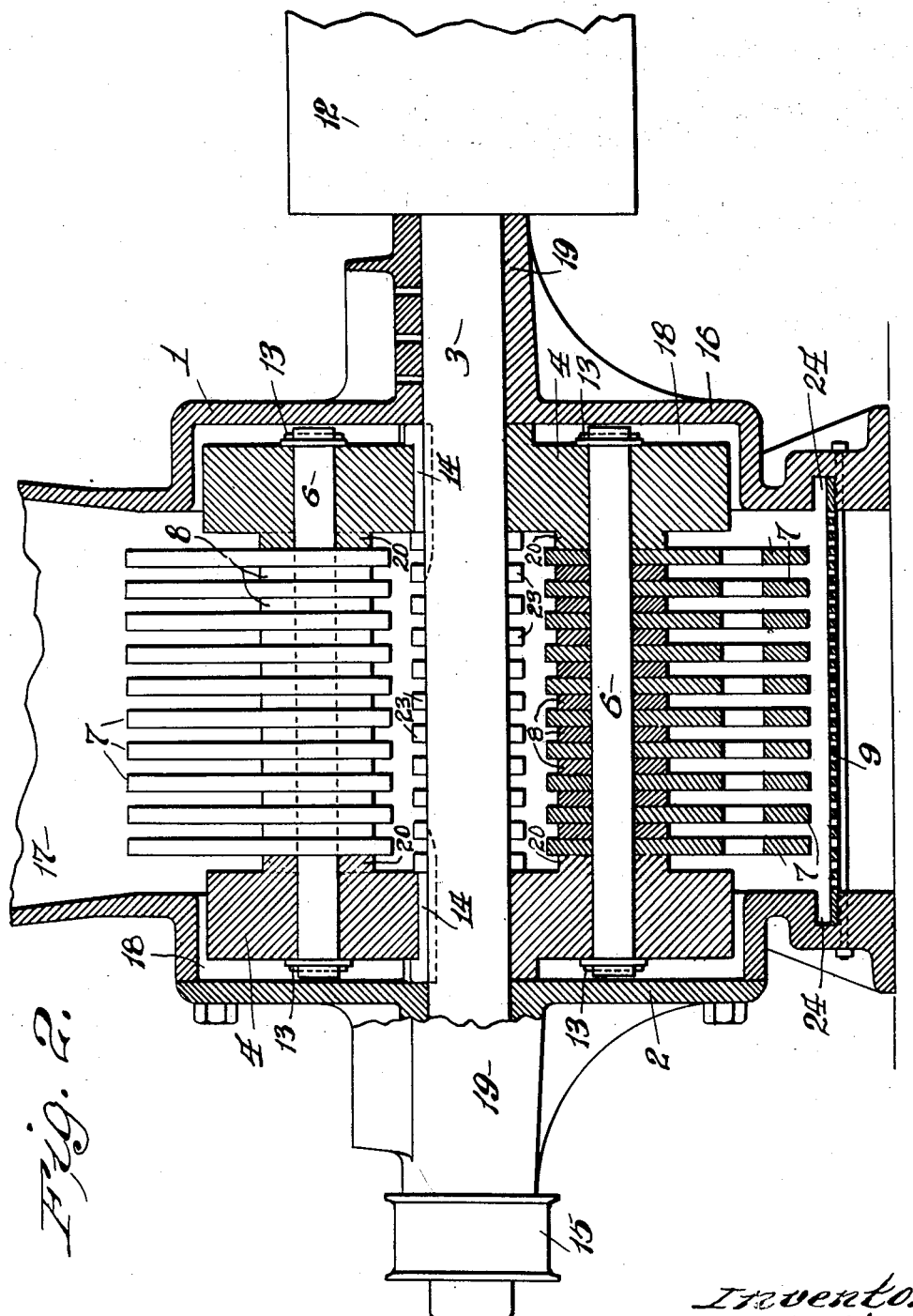

HARRY J. SHELTON, OF ST. LOUIS, MISSOURI.

HAMMER-MOUNTING FOR PULVERIZERS AND THE LIKE.

1,347,717.  Specification of Letters Patent.  Patented July 27, 1920.

Application filed October 31, 1917. Serial No. 199,595.

*To all whom it may concern:*

Be it known that I, HARRY J. SHELTON, a citizen of the United States of America, and a resident of the city of St. Louis, and State of Missouri, have invented certain new and useful Improvements in Hammer-Mountings for Pulverizers and the like, of which the following is a specification.

The primary object of this invention is to provide an improvement in the arrangement of the hammer mounting of pulverizers and the like so that the same can be quickly and economically mounted.

Another object is to provide an improvement in the construction of the parts relating to a hammer mounting of a pulverizer, in which one row of hammers will be arranged in staggered relation to adjacent rows of hammers.

Other and further objects will appear in the specification and be specifically pointed out in the appended claim, reference being had to the accompanying drawings exemplifying the invention, and in which, Figure 1 is a vertical section taken through a pulverizer showing this improved arrangement of hammer mounting.

Fig. 2 is a transverse section taken on the line II—II of Fig. 1.

Referring to the drawings, 1 designates a housing which has an integrally formed side wall 16, a removably mounted side wall 2, and extending upwardly from the housing is an integrally formed receiving chute 17.

Formed in the housing 1 adjacent each of the side walls 2 and 16 is a fly wheel chamber 18. Concentrically arranged and extending from each of the side walls 2 and 16 is a bearing 19, and horizontally arranged in said bearings is a revolubly mounted driven shaft 3, said shaft having a pulley 12 secured thereto at one end, and at the opposite end is secured a set collar 15. Secured to said shaft 3 by keys 14 are a pair of fly wheels 4, each of said fly wheels being located in their respective chambers 18.

Formed integral with the inner face of each of said fly wheels are a pair of diametrically opposed bosses 20, the pairs of bosses of each fly wheel being oppositely disposed to each other.

Mounted in said fly wheels and through each opposing pair of bosses 20 is a hammer shaft 6, and loosely mounted on each of said hammer shafts are a plurality of hammers 7, said hammers being spaced apart from each other by loosely mounted washers 8, the outer hammers of each row being spaced from the fly wheels 4 by the bosses 20.

These hammer shafts 6 are loosely mounted in the fly wheels 4 and are secured in place by the cotter keys 13. Supported by said fly wheels 4 is another pair of hammer shafts 22, said hammer shafts being held in place by cotter keys and washers, not shown, and are diametrically opposed to each other as are the shafts 6, said shafts 6 and 22 being set on the same radii and at equal distances apart. Loosely mounted on each of said shafts 22 are a plurality of hammers 23, said hammers being spaced apart by washers similar to the hammers 7 of the shafts 6, but on account of the fact that there are no bosses relative to the shafts 22, the outer hammers of each shaft will abut their respective fly wheels 4. In this way the hammers 23 of the shafts 22 will be in staggered or offset relation to the hammers 7 of the shafts 6.

Formed in each of the side walls of the housing is a circularly formed recess 24, and mounted in said recess is a discharge screen plate 9, said plate 9 being held in place by the retaining plate 10. Secured to the end wall 25 by a bolt 11 is a cutting face 5.

From the arrangement shown in the drawings, the hammers 7 and 23 are in outwardly extending positions such as they will be when the device is in operation, the invention residing in the mounting of the hammers between a pair of fly wheels which are keyed to a driven shaft, in which the fly wheels 4 are first secured to the shaft 3 in spaced apart positions as shown, then the hammer shafts 6 and 22 are inserted through their respective bores of the fly wheels, their respective hammers and spacing washers being mounted on their hammer shafts during the operation of passing each shaft from one fly wheel to the other, in which the hammers will be mounted in position between the fly wheels after each shaft has been supplied with the proper number of hammers, the retaining cotter keys are then secured to the shafts, thereby holding the shafts in position in the fly wheels.

In mounting the hammers on their respective shafts, the rule to be followed is that the first hammer mounted will abut against the fly wheel proper as relating to the shafts 22, whereas in the instance of mounting the hammers on the shafts 6, the first hammer will engage its respective boss 20, and after the first hammer relating to each shaft has been put in place, a washer is then mounted on the shaft, after which the alternate mounting of hammer and washer is carried out until the space between the fly wheels is filled.

From an arrangement of hammer mounting as just described, the time of erecting pulverizers and the like is reduced to a minimum, in which skilled labor is not required, as against the present day construction of hammer mountings which require skilled labor.

From the aforesaid simple construction of hammer mounting, it is to be readily seen that worn out hammers can be quickly removed from their supporting shafts, in which the removable side wall is taken off and the shaft 3 and several fly wheels 4 carried thereby and hammers pertaining thereto are removed from the housing 1, the cotter pins of the shafts 6 and 22 being removed so that said hammer shafts can be withdrawn from the fly wheels, and as they are being withdrawn, the hammers and washers will fall off their shafts.

In the majority of pulverizers now in use, each hammer is separately connected to an extending arm, the assembly and disassembly of each hammer being a separate and tedious operation.

What I claim is:

A hammer mounting for a pulverizer comprising a main shaft, a pair of spaced apart hammer shaft supporting members rigidly secured to said main shaft, each of said supporting members having a pair of diametrically opposing bosses formed integral therewith, said supporting members being arranged on said main shaft so as to have their respective pairs of bosses in horizontal alinement, a hammer shaft mounted in each pair of alining bosses of said supporting members, a plurality of spaced apart hammers loosely mounted on said shafts between said supporting members, each of said bosses of each supporting member abutting an adjacent hammer, a second pair of hammer shafts carried by said supporting members having spaced apart hammers mounted thereon, said bosses of said supporting members each being of a depth equal to the thickness of each of said washers, and providing means for arranging the hammers of said first mentioned hammer shafts in staggered relation to the hammers of said second mentioned hammer shafts and a washer the approximate thickness of each of said hammers, mounted on said hammer shafts between each of said hammers.

HARRY J. SHELTON.